United States Patent [19]
Williams

[11] Patent Number: 5,118,008
[45] Date of Patent: Jun. 2, 1992

[54] PROGRAMMABLE ADDITIVE CONTROLLER

[75] Inventor: Gary E. Williams, Duluth, Ga.

[73] Assignee: Titan Industries, Inc., Atlanta, Ga.

[21] Appl. No.: 629,651

[22] Filed: Dec. 7, 1990

[51] Int. Cl.⁵ .......................... B67B 7/00; B67D 5/22
[52] U.S. Cl. ........................................ 222/1; 222/14; 222/16; 222/57; 222/71
[58] Field of Search ............... 222/14, 16, 639, 71, 222/57, 1

[56] References Cited

U.S. PATENT DOCUMENTS

| | | | |
|---|---|---|---|
| 4,105,138 | 8/1978 | Lehmann et al. | 222/14 |
| 4,518,101 | 5/1985 | Robinson . | |
| 4,601,409 | 7/1986 | DeRegolo . | |
| 4,676,403 | 6/1987 | Goudy, Jr. et al. . | |
| 4,679,585 | 7/1987 | Ewing . | |
| 4,690,163 | 9/1987 | Steinemann . | |
| 4,706,703 | 11/1987 | Takeuchi et al. . | |
| 4,719,574 | 1/1988 | Duback et al. | 222/71 X |
| 4,794,947 | 1/1989 | Kuramochi . | |
| 4,840,292 | 6/1989 | Harvey . | |
| 4,877,051 | 10/1989 | Day . | |
| 4,961,441 | 10/1990 | Salter . | |

FOREIGN PATENT DOCUMENTS 1295896  5/1969  Fed. Rep. of Germany .
55-115111  9/1980  Japan .

OTHER PUBLICATIONS

OMNI-PAK Adcon Brochure.

Primary Examiner—Michael S. Huppert
Assistant Examiner—Gregory L. Huson
Attorney, Agent, or Firm—James Creighton Wray

[57] ABSTRACT

Programmable additive controllers control flow of fluid additives from a fluid supply line. A flowmeter is connected to the solenoid control valve for measuring flow of fluid. A controller opens and closes the control valve. A settable input controls cyclic operation of the controller. The controller further incorporates an input for required quantities of additive to be added on each cycle. A comparator in the controller compares a required quantity with signal output indicating flow through the flowmeter. The comparator is connected to a valve closing control for closing the control valve and preventing further flow of additive when the cumulative flowmeter output signal approaches the requirement. A three-way valve is connected to the flowmeter for selectively flowing fluid additive to a test and to an outlet for ejection into a mixing tank. The controller has an input for a local panel factor and reads out mixing ratio volume per cycle and total volume of additive.

20 Claims, 4 Drawing Sheets

120 VAC HIGH POWER
BLACK (POWER)
WHITE (NEUTRAL)
RED (ALARM LIGHT)
WHITE (NEUTRAL)
PURPLE (ADDITIVE PULSE)
ORANGE (ADDITIVE PULSE NEUTRAL)
RS-422 SERIAL COMMUNICATIONS
BLACK (TRANSMIT +)
ORANGE (TRANSMIT -)
BLUE (RECEIVE +)
PURPLE (RECEIVE -)
GREEN (GROUND)
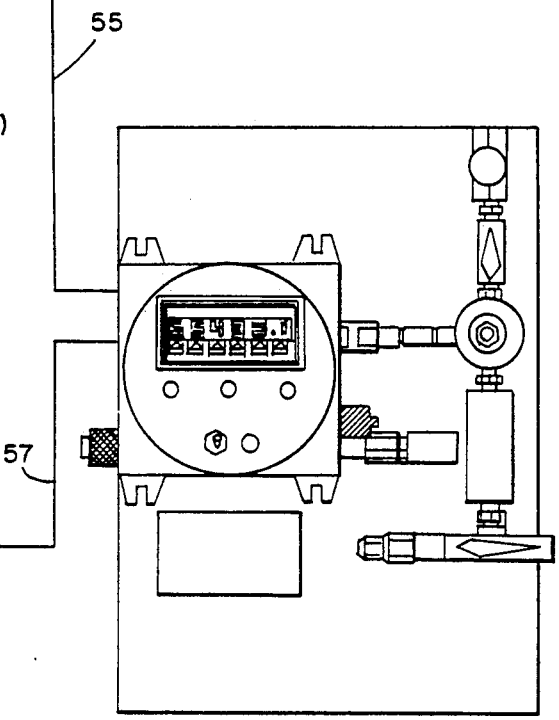
FIG. 3
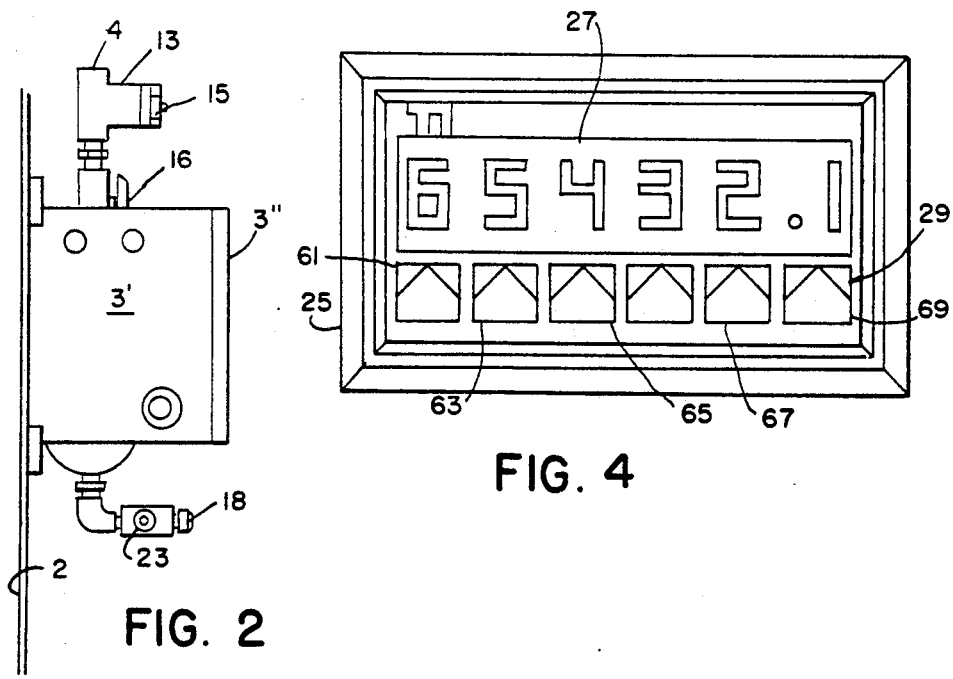
FIG. 2
FIG. 4

PROGRAMMABLE ADDITIVE CONTROLLER

BACKGROUND OF THE INVENTION

The invention relates to additive controllers for supplying or injecting a fluid, usually liquid additives, to large volumes of fluids, also usually liquids. One example is in supplying additive to gasoline stocks.

Prior art additive control and injection devices use positive displacement piston-type pumps to input additives in flow streams.

Problems exist in the positive displacement-type additive devices, in that flows may vary according to velocity, pump pressures and repetition frequencies. Positive displacement-type additive supply systems require reciprocation and other motion in which parts may wear, causing periodic system shutdown for rebuilding and replacement. This is especially true in systems which use high speed reciprocations for positive displacement.

Other problems are addressed by the present invention. One example of a problem with the prior art relates to fluids found in gasoline transport lines and tank farm terminals. Each oil company has particular additives to be supplied to gasoline stocks in particular ratios. The additives are added at tank farm terminals by injection into gasoline flowing in pipes, or by injection into gasoline flowing into tanks. Conventional piston-type injector panels are used. Piston-type injector panels maintenance related to the positive displacement reciprocations may adversely affect tank farm operation. Injection rates which vary according to viscosity, pump pressure and frequency may create inaccuracies in formulations.

The present invention is directed to solving those problems and other problems of the prior art.

SUMMARY OF THE INVENTION

The present invention solves problems of long-standing in the prior art by providing programmable additive controllers with few movable parts. The controllers do not depend on conventional piston-type injectors. The programmable additive controllers of the present invention have wide use in the chemical industry. The basic controller incorporates an additive supply line and a filter, a shut-off valve and a control valve. The control valve controls flow of fluid additives from the fluid supply line. A flowmeter is connected to the control valve for measuring volume of fluid. A three-way valve connects to the flowmeter for selectively flowing fluid additive either to a test collector or to an outlet for ejection into a mixing tank or pipe. A controller for opening and closing the control valve has a settable means for controlling cyclic operation of the control valve. The controller opens the control valve upon a command pulse, usually from the main product meter. The controller further incorporates an input for setting quantities of additive to be added on each cycle. A comparator in the controller compares a predetermined quantity with a signal output which indicates flow through the flowmeter. The comparator compares the flowmeter output to the preset cyclic input quantity and closes the control-valve and prevents further flow of additive when the cumulative flowmeter output approaches the predetermined cyclic input. The flowmeter continues to measure volume until the flow stops after the control valve is fully closed. If the flowmeter sends pulses to the comparator in excess of the preset value, the preset value is reduced for the next cycle. Measured volume below the preset value results in an increase in the preset value for the next cycle. The controller stores the number of command pulses, which are related to total volume of the main product.

The present programmable additive controller unit is a state-of-the-art, third generation microprocessor-based chemical additive injector panel suitable for a variety of chemical additive injection applications.

The system of the present invention provides additive totalizing, programmable preset and RS-422 data communications. The system provides automatic batch averaging, alarm display, security lockout and programmable meter factor. The present invention provides an explosion-proof controller which uses a state-of-the-art flowmeter. The controller has an EEPROM memory with a 10-year storage of data. The system is capable of operation from 130° F. to −40° F. with a heater. A thermostat heater turns on at 40° F. and off and 55° F.

A preferred embodiment of the system has ¼" inlet and outlet and test connections. A power supply uses 130 watts of 120 volt 60 cycle current. A solenoid control valve uses 22 watts, and an enclosure heater uses 100 watts. The system is constructed of high tech materials, 300 series stainless steel, Ryton, Kalrez and Teflon.

The system operating pressure is 250 lbs. per square inch maximum, and the differential pressure is 100 lbs. per square inch maximum. A preferred embodiment provides a minimum injection per cycle of about 5 or fewer 55 cc's, and a maximum of about 900 or more cc's per cycle.

The present system outperforms all conventional piston-type injector panels, regardless of viscosity, pump pressure or pulse frequency.

In one example of operation with hydraulic oil as a test medium, the system has a pressure drop of 25 lbs. per square inch and a meter pulse of 40:1. A typical additive injection pulse has a half-second duration. In the example of the product load rate of 600 gallons per minute and 15 cycles per minute, the system delivered 685 cc's per cycle, or 2.71 gallons per minute. Additive pump pressure was 125 lbs. per square inch, and line pressure was 40 lbs. per square inch. A preferred program additive controller system has dimensions of about $21 \times 17 \times 9$, and weighs about 33 lbs. The flowmeter has an accuracy of 0.05% of rate. Count input at standard high impedance, 3–30 VDC is about 10 kHz maximum. At low speed, the count may be 0–40 Hz, and at high speed 40 Hz to about 10 kHz.

Multiple panels may be used at spacings of about 4".
A 120 volt secondary alarm system is provided.

The present system includes an additive totalizer, a programmable preset, a programmable meter factor and an automatic batch averaging. A highly readable, 6-digit LED display is provided, with six controls. The system is provided with electrical quick disconnects, a solenoid disable switch and an alarm display. An external one-shot calibration switch is provided. The system is configured for an RS-422 serial communications. A 5-digit security lockout code is provided. The system may be used in a count-up or count-down mode. Solid state electronics and power surge protection are provided. The system provides high injection rates, which are difficult to achieve with other systems.

A state-of-the-art microprocessor and flowmeter are at the heart of the system. The microprocessor gathers, monitors, analyzes, controls and displays input data to precisely control and account for chemical additive injection. The additive controller combines the versatility and speed of a microprocessor with the accuracy and reliability of a highly accurate positive displacement flowmeter.

An RS-422 serial communications port provides enhanced terminal automation integration by allowing each programmable additive controller to communicate system information to such terminal automation equipment as a load computer, a programmable logic controller or a remote host computer. The system integration from the communications port may be as simple as printing total additive loaded on a load ticket, or as complex as providing remote monitoring and control of individual injectors by a host computer.

The additive controller of the present invention is externally paced, as is conventional in piston-type injectors. Pulses are typically 120 volt AC and are provided from an electrical pulse transmitter driven by a load meter. Timers and pulse generators may also be used to provide the required pulse. To the major state-of-the-art, high tech elements of the microprocessor and the positive displacement flowmeter there is added a solenoid control valve. While the solid state microprocessor monitors, communicates and controls functions of the injector, the solenoid control valve actually controls the flow of the additive. The preferred control valve is a two-way, 120 volt AC normally closed, direct acting stainless steel, explosion-proof solenoid valve. The valve is used as a control valve to control all additive flow. Control of the solenoid valve is provided by the microprocessor.

The positive displacement, gear-type flowmeter, such as described in U.S. Pat. Nos. 4,641,522 and 4,815,318, is highly reliable, easy to service and accurate within 0.05% of rate. The unit accurately accounts for all additive dispensed, and communicates its pulse count to the microprocessor via a low voltage, Hall effect sensor or other appropriate sensor.

A third counter totalizes the product being treated with additive. The A counter is used to count up to the preset A value (additive volume in cc's per injection). The B counter is used to totalize the grand total of additive injected (running total). The C counter is used to totalize the grand total of product treated (running total). This is significant because we have both totals so that the Titan Industries COMM-LINK I communications software can perform a statistical process control (SPC) function. The VIEW button on the face of the microprocessor provides access to view all three counter values The C counter counts and displays pulse inputs or counts coming from the product load meter (typically a 40:1 pulse so that each 40 gal. of gasoline equals 1 pulse generation or injection command). The COMM-LINK I software does the mathematics to convert the pulse count into gallons of product.

The batch averaging feature, as described, is a significant point. This feature is unique and provides the highest accuracy of injection. When a count more or less than the preset A count is actually received in counter A, the preset A is adjusted up or down by that same deviation of the measured count from the preset A count. For example, the preset A is 685, representing 685 cc's of additive for each control pulse related to 40 gallons of gasoline measured by a load meter. The flowmeter after cycle 10 indicates delivery of 685 cc's. The preset A remains 685. If after cycle 11 the flowmeter has pulsed to indicate a volume of 683 cc's, preset A is adjusted to 687 for cycle 12. If the flowmeter has pulsed to indicate 686 cc's for cycle 12, the preset A is adjusted to 686 (687 preset − 686 actual = 1 plus 685 target) for cycle 13. As a result, when 40,000 gallons of gasoline have been measured, 685,000 cc's of additive have been injected uniformly throughout the product deliveries.

These and further and other objects and features of the invention are apparent in the disclosure, which includes the above and ongoing written specification, with the claims and the drawings.

BRIEF DESCRIPTION OF THE DRAWINGS

FIG. 2 is a right side elevation.

FIG. 3 is a detail showing electrical connections to the microprocessor.

FIG. 4 shows a display of the microprocessor.

DETAILED DESCRIPTION OF THE DRAWINGS

Figure 1:
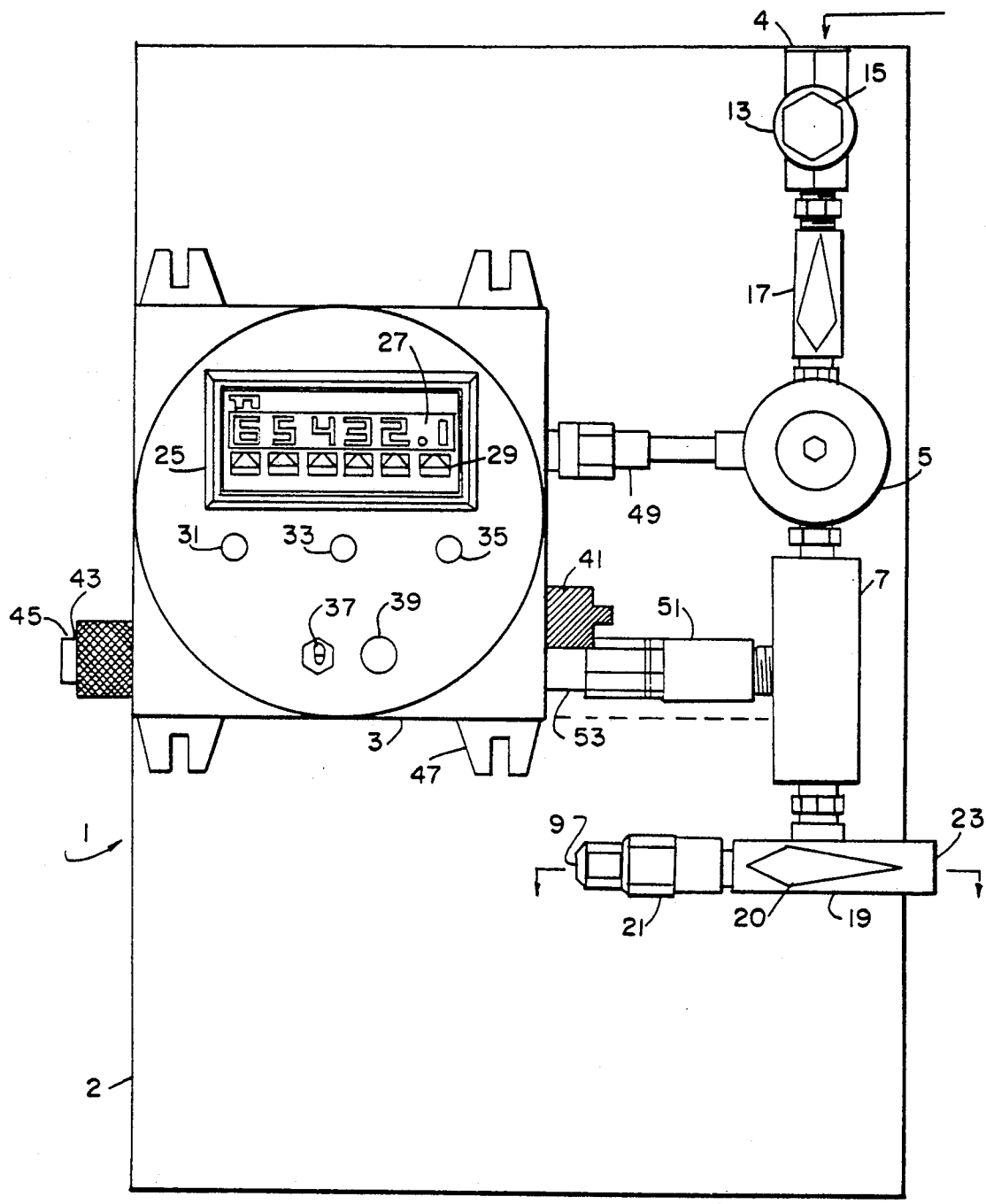
FIG. 1 is a front elevation of a panel of the invention.

Referring to FIG. 1, a programmable additive controller of the present invention is generally indicated by the numeral 1. The system includes a mounting panel 2 and a microprocessor 3, an inlet 4, a control valve 5, a flowmeter 7 and an outlet 9.

A filter 11 with a filter receiver 13 and a filter-holding cap 15 is connected to the additive inlet 4. An on-off, two-way ball valve 17 is connected between the filter 15 and the control valve 5. Flowmeter 7 is connected to the outlet of the control valve, and a three-way ball valve 19 is connected to the outlet of the flowmeter. The ball valve 19 has a control handle 20, which directs the output of the flowmeter through a check valve 21 to the outlet 9, which is connected to the main fluid flow. A test outlet 23 is opened with the control handle 20 as the outlet to check valve 21 is closed so that the output of the flowmeter may be collected and measured, such as in a beaker.

Processor 3 has a display panel 25 with a digital display 27 and push buttons 29 to control the processor and +he display. Lamp 31 indicates when the solenoid is energized to open the control valve 5. Flowmeter operation is shown by the flashing of lamp 33. Lamp 35 indicates an injection has been completed. An enable-disable switch 37 permits or prevents additive injection. A fuse 39 is mounted by switch 37. An off/auto switch 41 is mounted on the right side of the microprocessor. A calibration push button 43 and an alarm light 45 are mounted on the left side of the microprocessor 3. Feet 47 are used to mount the microprocessor on the panel 2. An electrical connection 49 connects the microprocessor to the solenoid control valve 5. A sensor 51, such as a Hall effect sensor, senses operation of the flowmeter 7 and communicates that operation to the microprocessor through connection 53.

FIG. 2 shows the shape of the control handles 16 and 18, and the filter receiver 13 and cap 15. Test outlet 23 is shown in FIG. 2, as is inlet 14.

Referring to FIG. 3, a 120 volt AC power connection 55 provides a two-wire power and neutral connector, a two-wire alarm connector and a two-wire pulse connector. Serial communications to the microprocessor 3 as shown schematically at 57 have two paired transmit wires, two paired receive wires, and a ground.

As shown in FIG. 4, the display panel 25 has a 6-digit, illuminated display 27. Push buttons 29 control functions of the microprocessor. Button 61 is pressed to reset the computer or to enter data. Lock button 63 is pressed to enter a lock code. Button 65 is pressed to view the preset cyclic additive quantity or to change that quantity. Button 67 is pressed to review totals of additive and main product, and button 69 is pressed to cycle between program choices.

All input data to the microprocessor 3 is easily programmed by the user and system data is LED displayed in direct engineering units (i.e. cubic centimeters or gallons).

The microprocessor contains a three counters. Counter A is used as the additive batch counter and is programmed to display its count in cc's per pulse activation. Counter B is programmed to display additive grand total and is programmed to display its count in gallons and tenths of gallons. By changing the location of the decimal point in the B counter, the microprocessor will display the additive grand total in hundredths. Counter C counts activating pulses which are related to product flow. The display displays product in gallons.

A permissive signal (typically 120 VAC) is received from the load computer. Activation of the microprocessor 3 is accomplished by the receipt of an externally paced 120 VAC pulses (injection command) from the load meter transmitter or pulsing device. On receipt of a pulse, the microprocessor energizes the solenoid control valve 5, opening the valve and allowing pressurized flow of additive through the flowmeter. The flow of additive through the flowmeter 7 results in the generation of low voltage pulses from the flowmeter to the microprocessor. Based on the flowmeter configuration and user programming, each pulse represents a quantity of additive. The pulse train represents total flow of additive. When the volume injected equals the programmed value for a preset batch count in counter A, the microprocessor de-energizes the solenoid control valve, thereby ending the injection cycle. The unit remains in a standby mode awaiting the next load meter pulse injection command to repeat the process.

In the normal mode of reset to zero, the microprocessor will count up from zero to the programmed preset value in counter A upon each pulse activation. The unit displays the actual injection volume in cubic centimeters for each pulse activation. Additionally, counter C increments upon each pulse activation and counter B computes a new additive grand total. By pressing key 69, the user may view the product total, the additive grand total or the batch count. The process is repeated throughout the tank or tank truck loading, until the load meter pulse and load permissive is terminated.

The present microprocessor incorporates a unique batch averaging feature which automatically scales the Preset A programmed value following each injection sequence, to compensate for changing hydraulic conditions. This feature insures the system will inject the exact programmed batch count (cubic centimeters per meter pulse), regardless of changing hydraulic conditions (i.e. additive pump pressure, pressure drop, viscosity).

The inlet supply pressure at inlet 4 should be at least about 20 psi above the total differential pressure expected. The capacity of the additive supply pump should exceed the total demand of all of the injectors which can operate simultaneously. Preferably the additive supply pump is twice the size necessary for the expected flow.

A stainless steel filter in receiver 13 is removable to remove any contamination from the additive line.

With the power applied to the microprocessor and the switch 41 in the auto position, the display shows product grand total, additive grand total or batch count. The injection lamp 35 lights to indicate a successful completion of the previous injection.

Switch 69 is pressed to change the display between batch count of a single injection cycle and additive grant total. On activation by a load pulse, the solenoid indicator light 31 turns on, indicating the solenoid has energized and that control valve 5 is open. The display increments rapidly to the preset batch count.

The flowmeter lamp 33 pulses, indicating low voltage pulses from the flowmeter. Illumination of lamps 31 and 33 simultaneously indicates flow through the flowmeter. The flowmeter lamp pulses are caused by pulses from the flowmeter.

On completion of the injection to the preset value, the control de-energizes the solenoid control valve 5 and the solenoid lamp 31 turns off. Injection lamp 35 remains on to signify satisfactory completion of the last injection. The flowmeter ceases to displace additive. However, lamp 33 may remain on if the flowmeter stops in an active pulse sensing position.

The purpose of the alarm light 45 is to advise a user of an alarm condition, which may be a component failure or malfunction, and to terminate power to the solenoid control valve, thereby eliminating the flow of additive.

The primary alarm deactivates the solenoid control valve and displays the word "help" on the display 27. The secondary alarm is a backup which turns off power to the control valve 5 and illuminates lamp 45 to indicate an alarm condition.

Testing and calibration of the injector is performed without opening the explosion-proof enclosure which surrounds the microprocessor 3.

The serial communications link 57 allows counting and control of each additive controller 1 remotely. All information programmed and displayed on the microprocessor 3 and the alarm conditions are communicated via a modem link to the host computer.

The individual microprocessor 3 can be configured to report daily at specified times or report by exception upon entering alarmed state.

The enable-disable switch 37 is used when power is required to the processor, but it is desired to disable the control valve 5. The off/auto switch provides external control of the injector external to the explosion-proof container 3' and cover 3", as shown in FIG. 2.

Figure 5:
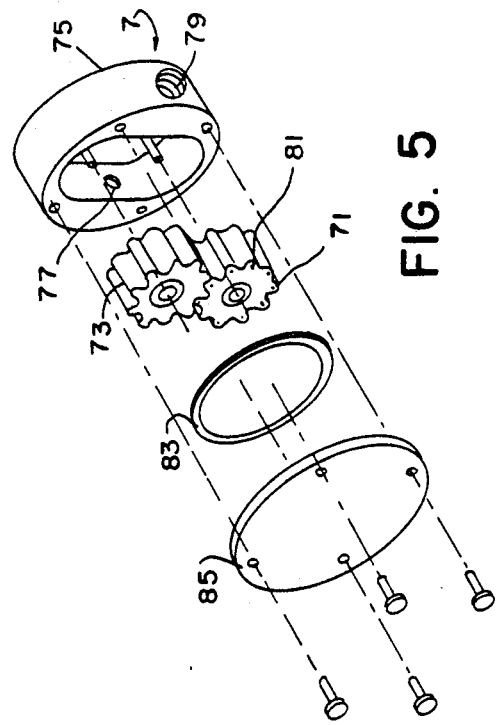
FIG. 5 is an exploded view of the flowmeter used with the present additive system.

The flowmeter 7, as shown in FIG. 5, has two rotating impellers 71 and 73, which rotate within a case 75. Fluid moves through inlet 77 to outlet 79. Each pocket formed between the lobes and the case forms a known volume. Magnets 81 are embedded in each lobe. As the magnets pass the Hall effect sensor 51 shown in FIG. 1, a 12 volt pulse is generated and transmitted to the microprocessor 3. Each pulse represents a known volume of additive, and the volumetric flow rate is determined by counting the pulses. The flowmeter is sealed by an O-ring 83, and is closed by a cover 85.

Figure 6:
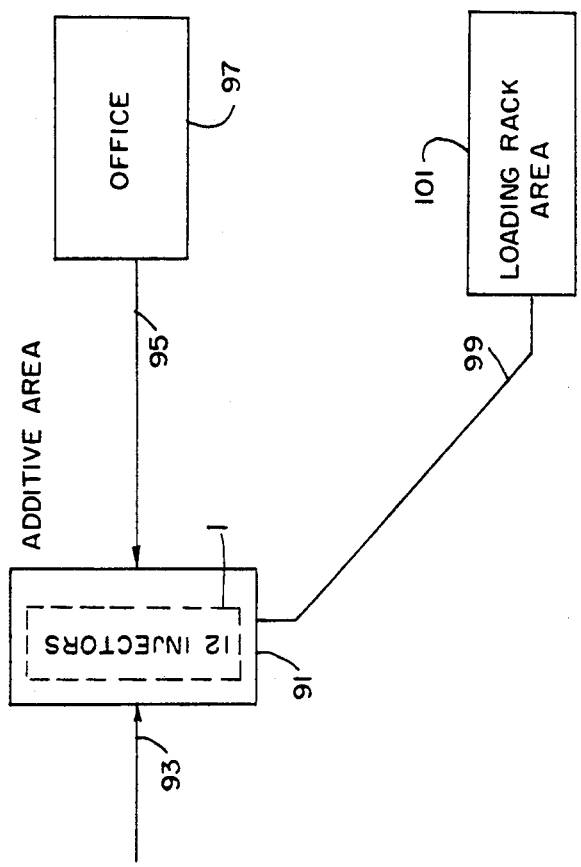
FIG. 6 is a schematic representation of the use of the present invention.
Figure 7:
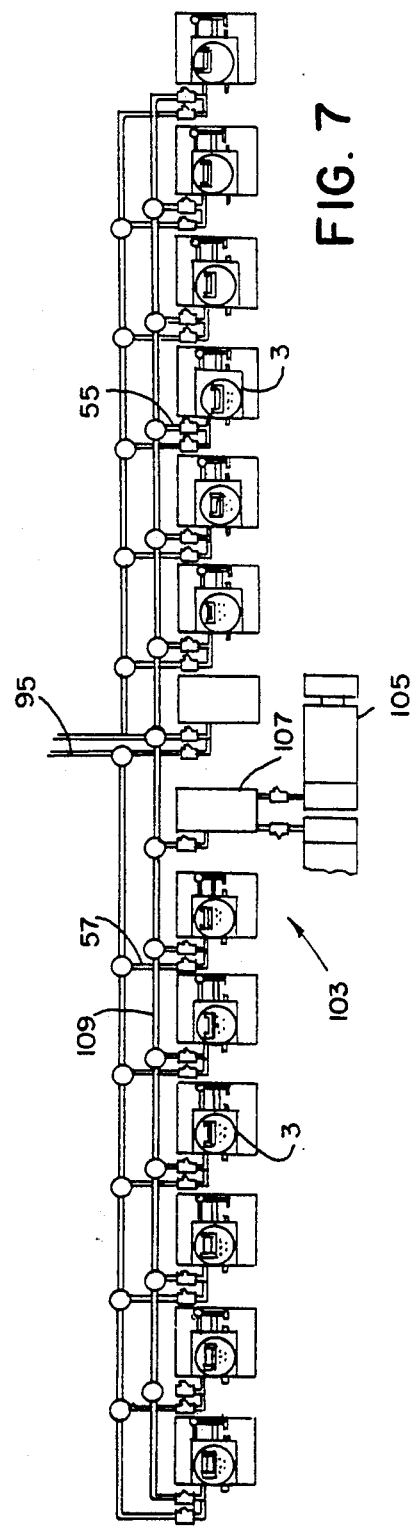
FIG. 7 is a schematic representation of an installation of the present invention.

As shown in FIG. 6, twelve injectors 1 are mounted in an additive area 91. A power supply 93 is provided to the injectors. A telephone line 95 connects the injector area to a remote office 97, and pulse and pump request circuits 99 connect the additive area 91 to a loading rack area 101. As shown in FIG. 7, the injector area has two additive pumps 103 and 105, which are supplied with power through a motor starter 107. The same power supply 109 supplies power to individual power lines 55 to the individual microprocessors 3. A telephone cable supplies communications to the individual communication lines 57 connected to the microprocessors 3. A typical operating system 110 comprises a programmable logic controller 11, which is connected to an electronic product meter 113 and a loading computer 115. Each additive injector 1 is connected to the main controller 111.

The electronic product meter 113 supplies pulses 117 to the controller 111, and the controller 111 supplies pulses 119 to each additive injector 1. The additive injector then supplies the predetermined ratio of additive to the product being measured by the electronic product meter.

Figure 8:
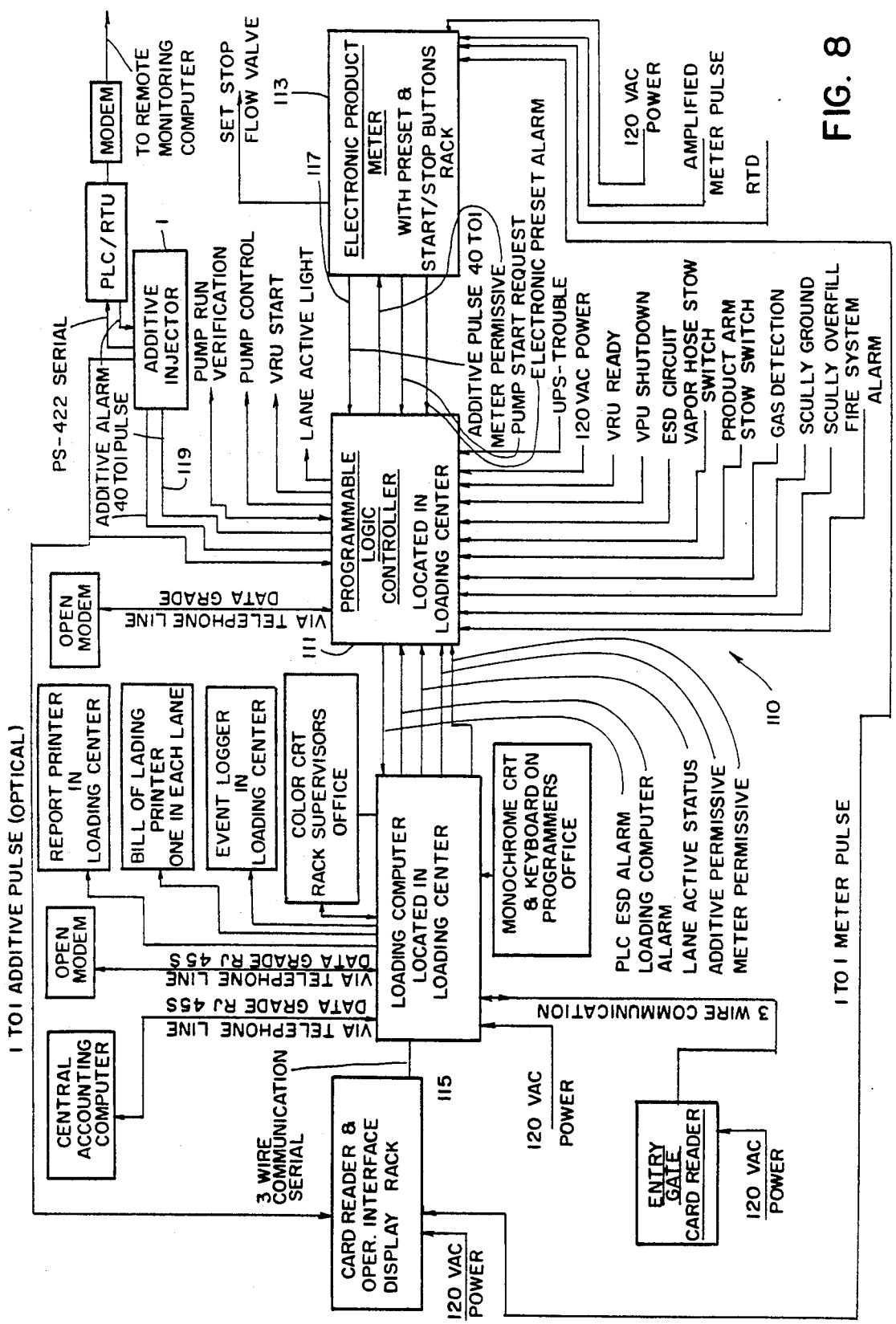
FIG. 8 is a block diagram of the operating system.

The other connections as shown and described in FIG. 8 are typical connections in an operating system for a loading rack configuration with additive remote monitoring.

While the invention has been described with reference to specific embodiments, modifications and variations of the invention may be constructed without departing from the scope of the invention, which is defined in the following claims.

I claim:

1. Programmable additive controller apparatus for the chemical industry, comprising an additive supply line, a filter connected to the additive supply line, a control valve connected to the filter for controlling flow of additive from the supply line, a flowmeter connected to the control valve for measuring flow of additive, the flowmeter having a signal output for indicating additive volumes flowing through the flowmeter, a controller connected to the control valve for cyclically opening the control valve upon a command pulse, the controller having an input for inputting a quantity of additive to be added on each cycle and the controller having an opener for opening the control valve, the controller having an accumulator for accumulating signal output from the flowmeter and the controller having a comparator for comparing accumulated signal output from the flowmeter and the input quantity, and having a closing control for closing the control valve and preventing further flow of additive when the accumulated flowmeter signal output approaches the input quantity, and further comprising an output connected to the flowmeter for ejecting the additive into a main material flow.

2. The apparatus of claim 1, further comprising a check valve connected to the output for preventing back flow through the output, a three-way valve connected between the flowmeter and the check valve and a test outlet connected to the three-way valve for selectively supplying additive from the flowmeter to the test output for physically measuring additive flowing through the flowmeter.

3. The apparatus of claim 1, wherein the controller has a digital display and a selector connected to the display for displaying preselected input quantity of additive for each cycle, flowmeter output during each cycle, and total cumulative additive.

4. The apparatus of claim 1, wherein the controller has first, second and third counters for counting additive flow during each cycle for counting total cumulative additive flow, and for counting command pulses from the product meter for indicating total product flow, respectively.

5. The apparatus of claim 1, wherein the opener for opening the control valve comprises resettable means responsive to an external starting pulse.

6. The apparatus of claim 5, wherein the controller has a switch for disconnecting the resettable control valve opening means.

7. The method of controlling additive injection to a chemical material flowing in a main line, comprising providing additive under pressure, filtering the additive, holding a control valve closed to prevent flow of the additive, presetting value A in a controller to preselect a quantity of additive flowing through a control valve upon each opening of the control valve, supplying power to the controller, supplying an injection command to the controller from a load method transmitter, opening the control valve in response to the command, metering flow from the control valve with a flowmeter, and injecting the output of the flowmeter into main line, incrementing first and second counters with signals from the flowmeter, comparing count in the first counter with the preselected quantity, closing the control valve upon reaching the preselected quantity with the count in the first counter.

8. The method of claim 7, further comprising incrementing a third counter upon each injection command.

9. The method of claim 8, further comprising displaying a preselected quantity in a controller display, wherein the injection command resets the controller display for displaying count-up to the predetermined quantity in the first counter, and wherein pressing a selector changes the display to display cumulative total of additive injected in the second counter, and further pressing the selector displays cumulative total.

10. The method of claim 8, further comprising indicating open condition of the control valve with an additive flow indicator.

11. The method of claim 10, further comprising indicating operation of a flowmeter with a pulsing indicator.

12. The method of claim 11, further comprising selectively enabling and disabling the opening of the control valve.

13. The method of claim 7, further comprising providing an alarm upon not reaching the preselected quantity with the count for plural cycles.

14. The method of claim 13, further comprising delaying operation of the alarm.

15. The method of claim 14, further comprising operating a second alarm upon failure of the first alarm.

16. The method of claim 15, further comprising delaying operation of the second alarm for a predetermined time.

17. The method claim 7, further comprising redirecting output of the flowmeter to a calibration test collector.

18. The method of claim 7, further comprising resetting the preselected quantity.

19. The method of claim 18, further comprising batch averaging by adjusting the preselected quantity for individual cycles.

20. The method of claim 19, wherein the batch averaging comprises adjusting the preselected quantity by changing the preselected quantity for one cycle by an amount equivalent and opposite from a difference between the preselected quantity and a actual measured additive volume for the previous injection.

* * * * *